US009633205B2

United States Patent
Guan

(10) Patent No.: US 9,633,205 B2
(45) Date of Patent: Apr. 25, 2017

(54) METHOD AND DEVICE FOR OBTAINING VIRUS SIGNATURES

(71) Applicant: Tencent Technology (Shenzhen) Co., Ltd., Shenzhen (CN)

(72) Inventor: Sheng Guan, Shenzhen (CN)

(73) Assignee: Tencent Technology (Shenzhen) Co., Ltd., Shenzhen (CN)

( * ) Notice: Subject to any disclaimer, the term of this patent is extended or adjusted under 35 U.S.C. 154(b) by 129 days.

(21) Appl. No.: 14/602,818

(22) Filed: Jan. 22, 2015

(65) Prior Publication Data

US 2015/0135323 A1 May 14, 2015

Related U.S. Application Data

(63) Continuation of application No. PCT/CN2014/083944, filed on Aug. 8, 2014.

(30) Foreign Application Priority Data

Aug. 22, 2013 (CN) .......................... 2013 1 0369733

(51) Int. Cl.
*G06F 21/56* (2013.01)

(52) U.S. Cl.
CPC ............ *G06F 21/564* (2013.01); *G06F 21/56* (2013.01); *G06F 2221/033* (2013.01)

(58) Field of Classification Search
CPC .............. G06F 21/56–21/567; G06F 2221/033
See application file for complete search history.

(56) References Cited

U.S. PATENT DOCUMENTS

| 5,452,442 A * | 9/1995 | Kephart | G06F 21/564 |
| | | | 713/188 |
| 2008/0263669 A1* | 10/2008 | Alme | G06F 21/56 |
| | | | 726/24 |
| 2012/0232836 A1* | 9/2012 | Ohmi | G06F 3/0304 |
| | | | 702/150 |

FOREIGN PATENT DOCUMENTS

| CN | 102346829 A | * 2/2012 |
| CN | 102708313 A | 10/2012 |

(Continued)

OTHER PUBLICATIONS $2^{nd}$ Office Action to Taiwan Application No. 103123647, dated Nov. 10, 2015 and English Summary, (8p).

(Continued)

*Primary Examiner* — Linglan Edwards
*Assistant Examiner* — Kevin Bechtel
(74) *Attorney, Agent, or Firm* — Brinks Gilson & Lione

(57) ABSTRACT

A method and a device for obtaining virus signatures in the field of computer security have been disclosed. The method includes: obtaining text strings contained in each virus sample within a virus sample set; selecting text strings for use as virus signatures candidate according to a first frequency at which each text string occurs in a non-virus sample set and a second frequency at which each text string occurs in the virus sample set; calculating an information entropy of the virus signatures candidate according to a quantity of virus samples containing the virus signatures candidate and a quantity of non-virus samples containing the virus signatures candidate; and selecting virus signatures from the virus signatures candidate according to the information entropy. The present disclosure may timely identify the latest virus signatures and ensure that the obtained virus signatures are optimal signatures and may identify a wide range of virus variants.

12 Claims, 2 Drawing Sheets

(56) References Cited

FOREIGN PATENT DOCUMENTS

| CN | 102779249 A | 11/2012 |
|---|---|---|
| JP | 2010073020 A | 4/2010 |

OTHER PUBLICATIONS

International Search Report and Written Opinion to PCT/CN2014/083944, dated Nov. 13, 2014, (11p).

\* cited by examiner

METHOD AND DEVICE FOR OBTAINING VIRUS SIGNATURES

CROSS-REFERENCE TO RELATED APPLICATIONS

The application is a continuation of PCT Application No. PCT/CN2014/083944, filed on Aug. 8, 2014, which claims priority to Chinese Patent Application No. 2013103697338, filed on Aug. 22, 2013, which are incorporated by reference in their entirety.

FIELD OF THE TECHNOLOGY

The present disclosure specifically relates to a method and device for obtaining virus signatures in the field of computer security.

BACKGROUND

With the development of computer technologies, a diversity of computer viruses has emerged. Viruses may do significant harms to computers, and may even cause breakdown of computers' operations. Therefore, antivirus software is installed on computers in order to protect the computers from such harms. Antivirus software checks whether computer files are infected with viruses according to virus signatures.

Virus signatures contained in antivirus software are obtained through a large number of virus samples, and the virus signatures are often analyzed manually by technical personnel. Manual analysis, however, involves large workload and is time-consuming. Accordingly, manual analysis may not be thorough enough to inclusively identify the latest virus signatures. As a result, antivirus software may miss out detecting some latest viruses within a certain period. In addition, manual analysis relies upon the experience of technical personnel, and variation in experience levels may not consistently be able to obtain optimal virus signatures. Therefore, the virus signatures obtained by manual analysis cannot cover a diversity of virus variants.

SUMMARY

To identify the latest viruses timely and identify a wide range of virus variants, the present disclosure provides a method and a device for obtaining virus signatures. The technical solution is as follows:

An embodiment of the disclosure discloses a method for obtaining virus signatures, the method includes at least the following operations: obtaining text strings contained in each virus sample within a virus sample set; selecting text strings for use as virus signatures candidate according to a first frequency at which each text string occurs in a non-virus sample set and a second frequency at which each text string occurs in the virus sample set; calculating an information entropy of the virus signatures candidate according to a quantity of virus samples containing the virus signatures candidate and a quantity of non-virus samples containing the virus signatures candidate; and selecting virus signatures from the virus signatures candidate according to the information entropy.

Another embodiment discloses a device for obtaining virus signatures, the device includes at least a processor with circuitry operating in conjunction with at least a memory storing codes to be executed to perform functions as a plurality of modules or units, wherein the plurality of modules or units include: an acquisition module, which causes the device to obtain text strings contained in each virus sample within a virus sample set; a first selecting module, which causes the device to select text strings for use as virus signatures candidate according to a first frequency at which each text string occurs in a non-virus sample set and a second frequency at which each text string occurs in the virus sample set; a calculating module, which causes the device to calculate an information entropy of the virus signatures candidate according to a quantity of virus samples containing the virus signatures candidate and a quantity of non-virus samples containing the virus signatures candidate; and a second selecting module, which causes the device to select virus signatures from the virus signatures candidate according to the information entropy.

Yet another embodiment of the disclosure discloses a non-transitory computer-readable storage medium, wherein the computer readable storage medium stores a program which comprises codes or instructions to cause a processor circuitry to execute operations for obtaining virus signatures, the operations include: obtaining text strings contained in each virus sample within a virus sample set; selecting text strings for use as virus signatures candidate according to a first frequency at which each text string occurs in a non-virus sample set and a second frequency at which each text string occurs in the virus sample set; calculating an information entropy of the virus signatures candidate according to a quantity of virus samples containing the virus signatures candidate and a quantity of non-virus samples containing the virus signatures candidate; and selecting virus signatures from the virus signatures candidate according to the information entropy.

The embodiment of the present disclosure selects text strings for use as virus signatures candidate according to the first frequency at which each text string occurs in a non-virus sample set, and according the second frequency at which each text string occurs within a virus sample set; calculates the information entropy of virus signatures candidate according to the quantity of virus samples containing virus signatures candidate and the quantity of non-virus samples containing virus signatures candidate; then selects virus signatures from the virus signatures candidate according to the information entropy. The process of obtaining virus signatures is thus automated and saves time by identifying the latest virus signatures in a timely manner. The text strings obtained from virus samples are subjected to secondary screening according to the information entropy, so the present disclosure may ensure that the obtained virus signatures are optimal signatures which may cover a wide range of virus variants.

BRIEF DESCRIPTION OF THE DRAWINGS

The accompanying drawings may be included to provide further understanding of the claims and disclosure which may be incorporated in, and constitute a part of this specification. The detailed description and illustrated embodiments described may serve to explain the principles defined by the claims.

DETAILED DESCRIPTION

The various embodiments of the disclosure may be further described in details in combination with attached drawings and embodiments below. It should be understood that the specific embodiments described here may be used only to explain the disclosure, and may not be used to limit the disclosure. In addition, for the sake of keeping description brief and concise, the newly added features, or features which may be different from those previously described in each new embodiment will be described in details. Similar features may be referenced back to the prior descriptions in a prior numbered drawing or referenced ahead to a higher numbered drawing. Unless otherwise specified, all technical and scientific terms herein may have the same meanings as understood by a person skilled in the art.

Embodiment 1

Figure 1:
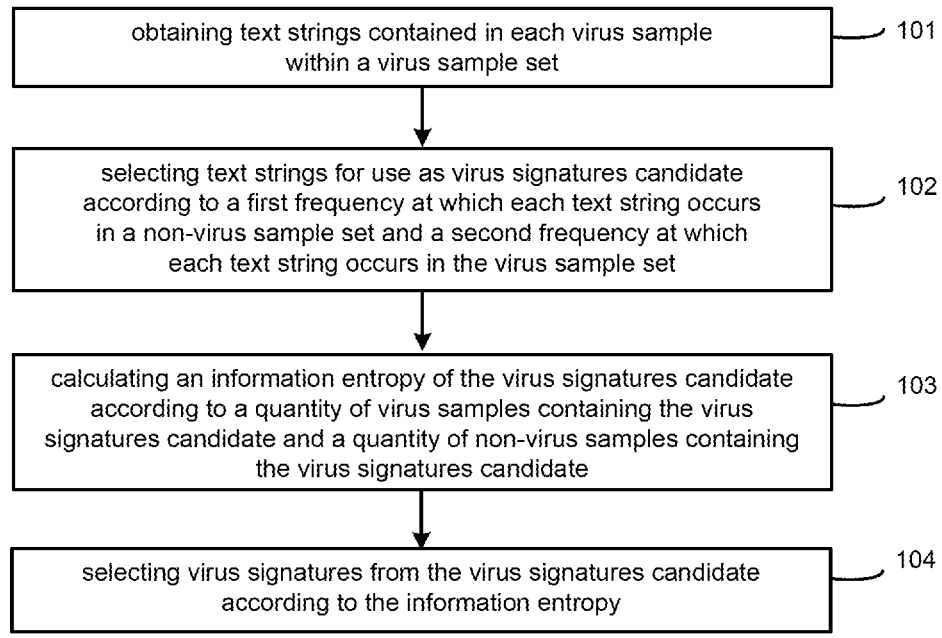
FIG. 1 shows a flowchart of a method for obtaining virus signatures, according to an embodiment of the disclosure.

As shown in FIG. 1, the method for obtaining virus signatures include at least the following operations:

Step 101: Obtaining text strings contained in each virus sample within a virus sample set;

Step 102: Selecting the text strings for use as virus signatures candidate according to a first frequency at which each text string occurs in a non-virus sample set and a second frequency at which each text string occurs within a virus sample set;

Step 103: Calculating an information entropy of virus signatures candidate according to the quantity of virus samples containing virus signatures candidate and a quantity of non-virus samples containing virus signatures candidate;

Step 104: Selecting virus signatures from the virus signatures candidate according to the information entropy.

According to the embodiment, the process of obtaining virus signatures is automated and therefore saving time to enable identifying the latest virus signatures in a timely manner. The text strings obtained from virus samples are subjected to secondary screening according to the information entropy to ensure that the obtained virus signatures are optimal signatures and may cover a wide range of virus variants.

Embodiment 2

Figure 2:
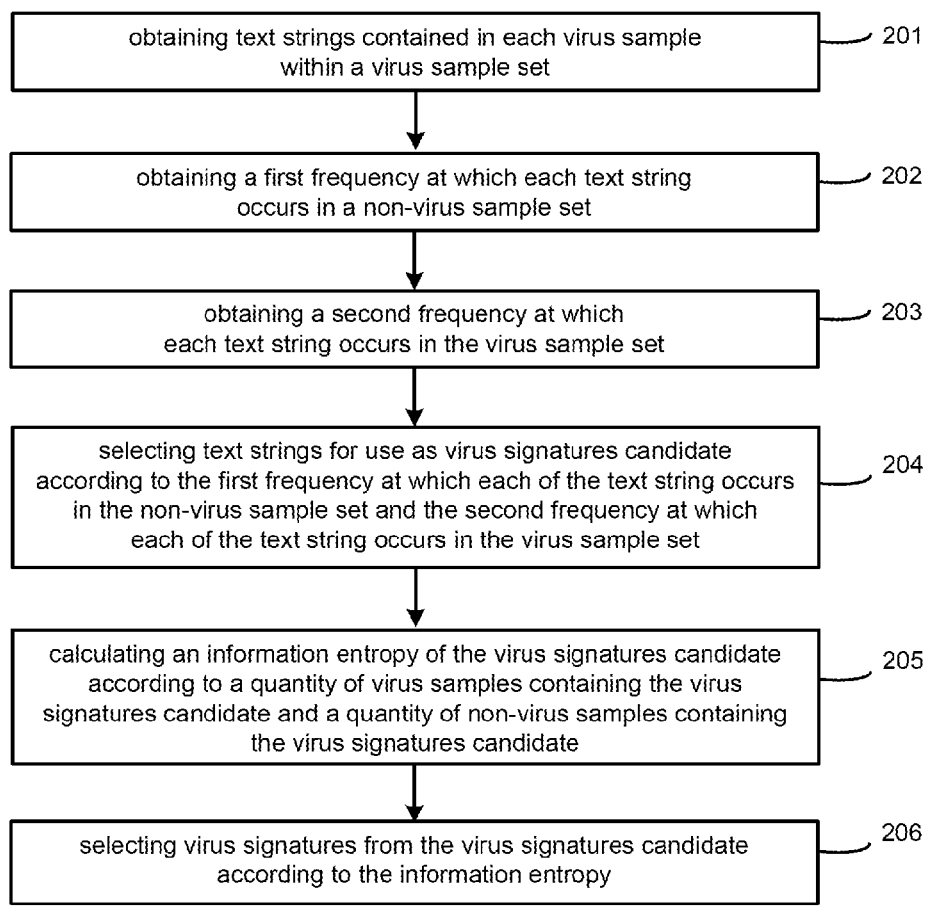
FIG. 2 shows a flowchart of a method for obtaining virus signatures, according to another embodiment of the disclosure.

As shown in FIG. 2, this embodiment of the present disclosure provides a method for obtaining virus signatures on the basis of embodiment 1, the operations include:

Step 201: Obtaining the text strings contained in each virus sample within a virus sample set; wherein, the virus sample set includes a plurality of virus samples and each virus sample constitutes a program file, each program file contains a plurality of code lines, and each code line may include one or a plurality of text strings.

More specifically, splitting of text strings may be performed for each code line in any virus sample contained in the virus sample set in order to obtain the text strings contained in the virus sample. The same operation may be performed for each of the other virus samples contained in the virus sample set in order to obtain the text strings contained in each of the other virus samples.

Step 202: Obtaining a first frequency at which each text string occurs in a non-virus sample set; wherein, the non-virus sample set may include a plurality of non-virus samples. Each non-virus sample may constitute a program file, each program file may contain a plurality of code lines, and each code line includes one or a plurality of text strings.

More specifically, the quantity of non-virus samples containing any text string in the non-virus sample set may be obtained, and the first frequency of the text string in the non-virus sample set may be calculated according to the quantity of non-virus samples containing the text string. The same operation may be performed for each of the other text strings to calculate the first frequency at which each of the other text strings occurs in the non-virus sample set.

In one embodiment, the calculating of the first frequency at which the text string occurs in the non-virus sample set according to the quantity of non-virus samples containing the text string may include: calculating a ratio of a quantity of non-virus samples containing the text string to a total quantity of non-virus samples in the non-virus sample set, and using the calculated ratio as the first frequency of the text string in the non-virus sample set.

Assuming that the virus sample set A may include 100 virus samples and the non-virus sample set B may include 100,000 non-virus samples, where "sendChargeSMS" may be a text string contained in a virus sample in the virus sample set. Obtaining 1 non-virus sample containing the text string "sendChargeSMS" in the non-virus sample set and thus determine the quantity of non-virus samples containing the text string "sendChargeSMS" as 1; calculating the ratio of the quantity (1) of non-virus samples containing the text string "sendChargeSMS" to the total quantity (100,000) of non-virus samples in the non-virus sample set is calculated to 0.001%; determining the ratio 0.001% as being the first frequency of the text string "sendChargeSMS" in the non-virus sample set.

Step 203: Obtaining a second frequency at which each text string occurs within the virus sample set. More specifically, the quantity of virus samples containing any text string in the virus sample set may be obtained, and the second frequency at which the text string occurs in the virus sample set may be calculated according to the quantity of virus samples containing the text string. The same operation may be performed for each of the other text strings to calculate the second frequency at which each of the other text strings occurs in the virus sample set.

In one embodiment, the calculating of the second frequency of the text string in the virus sample set according to the quantity of virus samples containing the text string may include the following operations: calculating the ratio of the quantity of virus samples containing the text string to the total quantity of virus samples in the virus sample set, and using the calculated ratio as the second frequency of the text string in the virus sample set.

For example, 100 virus samples containing the text string "sendChargeSMS" may be obtained from the virus sample set to determine the quantity of virus samples containing the text string "sendChargeSMS" to be 100; the ratio of the 100 virus samples containing the text string "sendChargeSMS" to the total quantity of 100 non-virus samples in the non-virus sample set is calculated to be 100%. The calculated ratio (100%) is determined as the second frequency at which the text string "sendChargeSMS" occurs in the virus sample set.

Step 204: Selecting text strings for use as virus signatures candidate according to the obtained first frequency at which each text string occurs in the non-virus sample set and the obtained second frequency at which each text string occurs in the virus sample set. More specifically, the text strings with a first frequency not exceeding a preset first frequency threshold and a second frequency exceeding a preset second frequency threshold may be selected from the obtained text strings; and the selected text strings are determined to be the virus signatures candidate.

Assuming that the preset first frequency threshold may be 50% and the preset second frequency threshold may be 50%. The first frequency (0.001%) of the text string "sendChargeSMS" may not exceed the preset first frequency threshold (50%), and the second frequency (100%) of the text string "sendChargeSMS" may exceed the preset second frequency threshold (50%). Therefore, the text string "sendChargeSMS" may be determined to be a candidate virus signature.

Step 205: Calculating information entropy of virus signatures candidate according to the quantity of virus samples containing virus signatures candidate and a quantity of non-virus samples containing virus signatures candidate.

More specifically, for any candidate virus signature, the present disclosure calculates the quantity of virus samples not containing the virus signature candidate according to the quantity of virus samples containing the candidate virus signature; calculates the quantity of non-virus samples not containing the virus signature candidate according to the quantity of non-virus samples containing the candidate virus signature; and calculates the information entropy of the virus signature candidate according to the quantity of virus samples containing the candidate virus signature, the quantity of virus samples not containing the candidate virus signature, the quantity of non-virus samples containing the candidate virus signature, and the quantity of non-virus samples not containing the candidate virus signature. For each of the other virus signatures candidate, the same operation may be performed to calculate the information entropy of each of the other virus signatures candidate.

Wherein, the information entropy of any virus signature candidate may be utilized to measure the ability of the virus signature to identify if a program file pertain to viruses or not. The operation of calculating the information entropy of the virus signatures candidate include: calculating the information entropy of the virus signatures candidate by using formula (1) (see below), according to the quantity of virus samples containing the virus signatures candidate, the quantity of virus samples not containing virus signatures candidate, the quantity of non-virus samples containing the virus signatures candidate, and the quantity of non-virus samples not containing the virus signatures candidate. Formula (1) is as follows:

$$H = \frac{S_1}{S}\left(\frac{S_{11}}{S_1}\log\frac{S_1}{S_{11}} + \frac{S_{12}}{S_1}\log\frac{S_1}{S_{12}}\right) + \frac{S_2}{S}\left(\frac{S_{21}}{S_2}\log\frac{S_2}{S_{21}} + \frac{S_{22}}{S_2}\log\frac{S_2}{S_{22}}\right); \quad (1)$$

Wherein:

H stands for the information entropy of the virus signatures candidate,

S stands for the sum of the quantity of virus samples within a virus sample set and the quantity of non-virus samples in a non-virus sample set, S1 stands for the quantity of virus samples within a virus sample set, S11 stands for the quantity of virus samples containing the virus signatures candidate, S12 stands for the quantity of virus samples not containing the virus signatures candidate;

S2 stands for the quantity of non-virus samples in a non-virus sample set,

S21 stands for the quantity of non-virus samples containing the virus signatures candidate, S22 stands for the quantity of non-virus samples not containing the virus signatures candidate.

The following example may illustrate a scenario of the information entropy of the virus signatures candidate (H). Assuming 1 being the quantity for non-virus samples which includes the virus signature candidate "sendChargeSMS", then the quantity of non-virus samples which does not include the text string "sendChargeSMS" is being calculated to be 99,999; and assuming that 100 being the quantity of virus samples which include the text string "sendChargeSMS", and the quantity of virus samples which does not include the text string "sendChargeSMS" is being calculated to be 0.

The information entropy of the virus signatures candidate (H) is calculated according to the quantity of virus samples containing the virus signatures candidate, the quantity of virus samples not containing the virus signatures candidate, the quantity of non-virus samples containing the virus signatures candidate, and the quantity of non-virus samples not containing the virus signatures candidate, where H is calculated to be:

$$H = \frac{100}{100100}\left(\frac{100}{100}\log\frac{100}{100} + \frac{0}{100}\log\frac{100}{0}\right) + \frac{100000}{100100}\left(\frac{1}{100000}\log\frac{100000}{1} + \frac{99999}{100000}\log\frac{100000}{99999}\right) = 0.000054$$

Step 206: Selecting virus signatures from the virus signatures candidate according to the information entropy. More specifically, the virus signatures candidate with the information entropy not exceeding a preset information entropy threshold may be selected and the selected virus signatures candidate may be determined to be virus signatures; or a preset number of virus signatures candidate with the minimum information entropy may be selected, and the selected virus signatures candidate may be determined as the virus signatures.

If assuming that the preset information entropy threshold is set as 0.0008; and since the information entropy (0.000054) of the virus signature candidate "sendChargeSMS" is smaller than the preset information entropy threshold (0.0008), therefore the virus signature candidate "sendChargeSMS" is determined to be a virus signature.

As seen in the above embodiment, the process of obtaining virus signatures may be automated and thus is time-saving which enables identifying the latest virus signatures in a timely manner. The text strings obtained from virus samples may be subjected to secondary screening in order to ensure that the obtained virus signatures are optimal signatures and may cover a wide range of virus variants.

Embodiment 3

Figure 3:
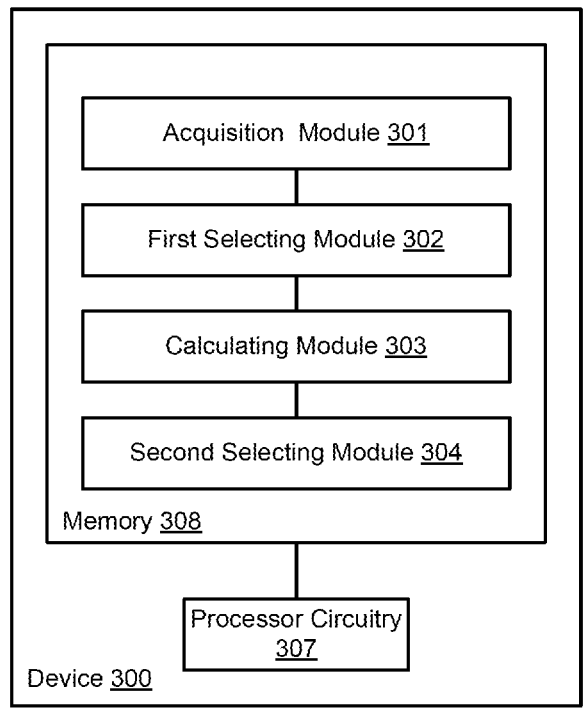
FIG. 3 shows an exemplary structure diagram of a device for obtaining virus signatures, according to an embodiment of the disclosure.

As shown in FIG. 3, the embodiment of the present disclosure provides a device (300) for obtaining virus signatures. The device (300) may include: at least a processor with circuitry operating (307) in conjunction with at least a memory (308) storing codes to be executed to perform functions as a plurality of modules or units, wherein the plurality of modules or units may include: an acquisition module (301), a first selecting module (302), a calculating module (303), and a second selecting module (304).

The acquisition module (301) causes the device to obtain the strings contained in each virus sample within a virus sample set;

The first selecting module (302) causes the device to select the text string as a virus signature candidate according to a first frequency at which the text string occurs in a non-virus sample set and a second frequency at which the text string occurs in the virus sample set;

The calculating module (303) causes the device to calculate the information entropy of a virus signature candidate according to a quantity of virus samples containing the virus signature candidate and a quantity of non-virus samples containing the candidate virus signature;

The second selecting module (304) causes the device to select virus signatures from the virus signatures candidate according to the information entropy.

In another embodiment, the first selecting module (302) further include: a first selecting unit, which causes the device to select the text strings with a first frequency not exceeding a preset first frequency threshold and a second frequency exceeding a preset second frequency threshold; and a determining unit, which causes the device to determine the selected text strings to be virus signatures candidate.

Wherein, the first selecting module (302) further includes: a first acquisition unit, which causes the device to obtain the quantity of non-virus samples containing each text string and respectively calculate the first frequency at which each text string occurs in a non-virus sample set according to the quantity of non-virus samples which are included in each of the text string.

Furthermore, the first selecting module (302) may include: a second acquisition unit, which causes the device to obtain the quantity of virus samples containing each text string and respectively calculate the second frequency at which each text string occurs in the virus sample set according to the quantity of virus samples which are included in each of the text string.

Wherein, the calculating module (303) may include: a first calculating unit, which causes the device to calculate the quantity of virus samples not containing the virus signatures candidate according to the quantity of virus samples containing the determined virus signatures candidate; a second calculating unit, which causes the device to calculate the quantity of non-virus samples not containing the virus signatures candidate according to the quantity of non-virus samples containing the determined virus signatures candidate; a third calculating unit, which causes the device to calculate the information entropy of the virus signatures candidate according to the quantity of virus samples containing the determined virus signatures candidate, the quantity of virus samples not containing the virus signatures candidate, the quantity of non-virus samples containing the virus signatures candidate, and the quantity of non-virus samples not containing the virus signatures candidate.

Wherein, the third calculating unit causes the device to calculate the information entropy of the virus signatures candidate by using the above described formula (1), according to the quantity of virus samples containing the determined virus signatures candidate, the quantity of virus samples not containing the virus signatures candidate, the quantity of non-virus samples containing the virus signatures candidate, and the quantity of non-virus samples not containing the virus signatures candidate:

$$H = \frac{S_1}{S}\left(\frac{S_{11}}{S_1}\log\frac{S_1}{S_{11}} + \frac{S_{12}}{S_1}\log\frac{S_1}{S_{12}}\right) + \frac{S_2}{S}\left(\frac{S_{21}}{S_2}\log\frac{S_2}{S_{21}} + \frac{S_{22}}{S_2}\log\frac{S_2}{S_{22}}\right); \quad (1)$$

Wherein:
H stands for the information entropy of the virus signatures candidate,
S stands for the sum of the quantity of virus samples within a virus sample set and the quantity of non-virus samples in a non-virus sample set,
S1 stands for the quantity of virus samples within a virus sample set,
S11 stands for the quantity of virus samples containing the virus signatures candidate,
S12 stands for the quantity of virus samples not containing the virus signatures candidate;
S2 stands for the quantity of non-virus samples in a non-virus sample set,
S21 stands for the quantity of non-virus samples containing the virus signatures candidate,
S22 stands for the quantity of non-virus samples not containing the virus signatures candidate.

Wherein, the second selecting module (304) may include: a second selecting unit which causes the device to select the virus signatures candidate with the information entropy not exceeding a preset information entropy threshold, and determine the selected virus signatures candidate as virus signatures; or a third selecting unit which causes the device to select a preset number of virus signatures candidate with the minimum information entropy, and determine the selected virus signatures candidate to be virus signatures.

It should be pointed out that the device (300) for obtaining virus signatures provided in the above embodiment is for illustrating the above functional modules. In practice, the above functions may be performed by different functional modules as required. In addition the internal structure of the device (300) may be divided further into different functional modules, so as to perform some or all of the functions described above. Furthermore, the device for obtaining virus signatures provided in the above embodiment complies with the same guiding principle as the embodiments of the method for obtaining virus signature as earlier described.

The modules and units described as separate parts may be or may not be physically separated, and parts displayed as units may be or may not be physical units, that is, they may be located at the same place or be distributed on multiple network units. Some or all of the modules may be selected as needed to attain the objectives of this embodiment. A person with ordinary skills in the art may understand and carry out it without inputting creative effort.

The sequence numbers of the above-mentioned embodiments may be intended only for description, instead of indicating the relative merits of the embodiments. It should be understood by those with ordinary skill in the art that all or some of the steps of the foregoing embodiments may be implemented by hardware, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive. ROM or flash memory. The computer-executable commands may enable a computer, a server, a smart phone, a tablet or any similar computing device to obtain virus signatures operations.

What is claimed is:

1. A method for obtaining at least one virus signature, comprising:
   having a plurality of computer files stored in one or more memory locations of a host computing device;

executing by a processor of the host computing device, an anti-virus program stored in a non-transitory computer-readable storage medium of the host computer device to detect if any of the plurality of computer files stored in the one or more memory locations of the host computing device are infected with one or more viruses according to an identification of at least one virus signature, comprising the host computing device performing:

obtaining at least one text string of characters sequence contained in a program code line of each virus sample which is comprised within a virus sample set;

selecting the at least one text string of characters sequence for use as a virus signatures candidate according to a first frequency at which the at least one text string of characters sequence occurs in the program code line of a non-virus sample which is comprised within a non-virus sample set, and a second frequency at which the at least one text string of characters sequence occurs in the program code line of the virus sample set, wherein the selecting of the at least one text string of characters sequence for use as virus signatures candidate is based upon the first frequency not exceeding a preset first frequency threshold and the second frequency exceeding a preset second frequency threshold;

calculating an information entropy of the virus signatures candidate by using the following formula (1), according to the quantity of virus samples containing the virus signatures candidate, the quantity of virus samples not containing the virus signatures candidate, the quantity of non-virus samples containing the virus signatures candidate, and the quantity of non-virus samples not containing the virus signatures candidate;

$$H = \frac{S_1}{S}\left(\frac{S_{11}}{S_1}\log\frac{S_1}{S_{11}} + \frac{S_{12}}{S_1}\log\frac{S_1}{S_{12}}\right) + \frac{S_2}{S}\left(\frac{S_{21}}{S_2}\log\frac{S_2}{S_{21}} + \frac{S_{22}}{S_2}\log\frac{S_2}{S_{22}}\right); \quad (1)$$

wherein H stands for the information entropy of the virus signatures candidate, S stands for the sum of the quantity of virus samples within a virus sample set and the quantity of non-virus samples in a non-virus sample set, $S_1$ stands for the quantity of virus samples within a virus sample set, $S_{11}$ stands for the quantity of virus samples containing the virus signatures candidate, $S_{12}$ stands for the quantity of virus samples not containing the virus signatures candidate; and $S_2$ stands for the quantity of non-virus samples in a non-virus sample set, $S_{21}$ stands for the quantity of non-virus samples containing the virus signatures candidate, $S_{22}$ stands for the quantity of non-virus samples not containing the virus signatures candidate; and selecting virus signatures from the virus signatures candidate according to the information entropy.

2. The method according to claim 1, wherein the selecting of at least one text string of characters sequence for use as virus signatures candidate is preceded by:

obtaining the quantity of non-virus samples containing each of the at least one text string of characters sequence, and calculating the first frequency at which each of the at least one text string of characters sequence occurs respectively in the non-virus sample set according to the quantity of non-virus samples which are included in each of the at least one text string of characters sequence.

3. The method according to claim 1, wherein the selecting of at least one text string of characters sequence for use as virus signatures candidate is preceded by:

obtaining the quantity of virus samples containing each of the at least one text string of characters sequence, and respectively, calculating the second frequency at which each of the at least one text string of characters sequence occurs in the virus sample set according to the quantity of virus samples which are included in each of the at least one text string of characters sequence.

4. The method according to claim 1, wherein the selecting virus signatures among the virus signatures candidate according to the information entropy comprises:

selecting the virus signatures candidate with the information entropy not exceeding a preset information entropy threshold, and determining the selected virus signatures candidate to be virus signatures; or, selecting a preset number of virus signatures candidate with the minimum information entropy, and determining the selected virus signatures candidate to be virus signatures.

5. A host computing device for obtaining at least one virus signature, comprises:

a plurality of computer files stored in one or more memory locations of the host computing device;

at least a processor with circuitry operating in conjunction with non-transitory computer-readable storage medium storing codes of an anti-virus program that, when executed by the processor, causes the host computing device to detect if any of the plurality of computer files stored in the one or more memory locations of the host computing device are infected with one or more viruses according to an identification of at least one virus signature, comprising the host computing device configured to:

obtain at least one text string of characters sequence contained in a program code line of each virus sample which is comprised within a virus sample set;

select the at least one text string of characters sequence for use as a virus signatures candidate according to a first frequency at which the at least one text string of characters sequence occurs in a program code line of a non-virus sample which is comprised within a non-virus sample set, and a second frequency at which the at least one text string of characters sequence occurs in the program code line of the virus sample set, wherein the at least one text string of characters sequence for use as virus signatures candidate is selected based upon the first frequency not exceeding a preset first frequency threshold and the second frequency exceeding a preset second frequency threshold;

calculate an information entropy of the virus signatures candidate by using the following formula (1), according to the quantity of virus samples containing the virus signatures candidate, the quantity of virus samples not containing the virus signatures candidate, the quantity of non-virus samples containing the virus signatures candidate, and the quantity of non-virus samples not containing the virus signatures candidate;

$$H = \frac{S_1}{S}\left(\frac{S_{11}}{S_1}\log\frac{S_1}{S_{11}} + \frac{S_{12}}{S_1}\log\frac{S_1}{S_{12}}\right) + \frac{S_2}{S}\left(\frac{S_{21}}{S_2}\log\frac{S_2}{S_{21}} + \frac{S_{22}}{S_2}\log\frac{S_2}{S_{22}}\right); \quad (1)$$

wherein H stands for the information entropy of the virus signatures candidate, S stands for the sum of the quantity of virus samples within a virus sample set and the quantity of non-virus samples in a non-virus sample set, $S_1$ stands for the quantity of virus samples within a virus sample set, $S_{11}$ stands for the quantity of virus samples containing the virus signatures candidate, $S_{12}$ stands for the quantity of virus samples not containing the virus signatures candidate; and $S_2$ stands for the quantity of non-virus samples in a non-virus sample set $S_{21}$ stands for the quantity of non-virus samples containing the virus signatures Candidate, $S_{22}$ stands for the quantity of non-virus samples not containing the virus signatures candidate; and select virus signatures from the virus signatures candidate according to the information entropy.

6. The host computing device according to claim 5, further configured to:

obtain the quantity of non-virus samples containing each of the at least one text string of characters sequence, and calculate the first frequency at which each of the at least one text string of characters sequence occurs respectively in a non-virus sample set according to the quantity of non-virus samples which are included in each of the at least one text string of characters sequence.

7. The host computing device according to claim 5, further configured to:

obtain the quantity of virus samples containing each of the at least one text string of characters sequence, and respectively calculate the second frequency at which each of the at least one text string of characters sequence occurs in the virus sample set according to the quantity of virus samples which are included in each of the at least one text string of characters sequence.

8. The host computing device according to claim 5, further configured to:

select the virus signatures candidate with the information entropy not exceeding a preset information entropy threshold, and determining the selected virus signatures candidate as virus signatures; or, select a preset number of virus signatures candidate with the minimum information entropy, and determining the selected virus signatures candidate as virus signatures.

9. A non-transitory computer-readable storage medium, wherein the computer readable storage medium stores an anti-virus program which comprises codes or instructions to cause a processor circuitry in a host computer device to execute operations for obtaining at least one virus signature, the operations comprising:

having a plurality of computer files stored in one or more memory locations of a host computing device;

executing by a processor of the host computing device, an anti-virus program stored in a non-transitory computer-readable storage medium of the host computer device to detect if any of the plurality of computer files stored in the one or more memory locations of the host computing device are infected with one or more viruses according to an identification of at least one virus signature, comprising the host computing device performing:

obtaining at least one text string of characters sequence contained in a program code line of each virus sample which is comprised within a virus sample set;

selecting the at least one text string of characters sequence for use as a virus signatures candidate according to a first frequency at which the at least one text string of characters sequence occurs in the program code line of a non-virus sample which is comprised within a non-virus sample set, and a second frequency at which the at least one text string of characters sequence occurs in the program code line of the virus sample set, wherein the selecting of the at least one text string of characters sequence for use as virus signatures candidate is based upon the first frequency not exceeding a preset first frequency threshold and the second frequency exceeding a preset second frequency threshold;

calculating an information entropy of the virus signatures candidate by using the following formula (1), according to the quantity of virus samples containing the virus signatures candidate, the quantity of virus samples not containing the virus signatures candidate, the quantity of non-virus samples containing the virus signatures candidate, and the quantity of non-virus samples not containing the virus signatures candidate;

$$H = \frac{S_1}{S}\left(\frac{S_{11}}{S_1}\log\frac{S_1}{S_{11}} + \frac{S_{12}}{S_1}\log\frac{S_1}{S_{12}}\right) + \frac{S_2}{S}\left(\frac{S_{21}}{S_2}\log\frac{S_2}{S_{21}} + \frac{S_{22}}{S_2}\log\frac{S_2}{S_{22}}\right); \quad (1)$$

wherein H stands for the information entropy of the virus signatures candidate, S stands for the sum of the quantity of virus samples within a virus sample set and the quantity of non-virus samples in a non-virus sample set, $S_1$ stands for the quantity of virus samples within a virus sample set, $S_{11}$ stands for the quantity of virus samples containing the virus signatures candidate, $S_{12}$ stands for the quantity of virus samples not containing the virus signatures candidate; and $S_2$ stands for the quantity of non-virus samples in a non-virus sample set, $S_{21}$ stands for the quantity of non-virus samples containing the virus signatures candidate, $S_{22}$ stands for the quantity of non-virus samples not containing the virus signatures candidate; and selecting virus signatures from the virus signatures candidate according to the information entropy.

10. The non-transitory computer-readable storage medium according to claim 9, wherein the selecting of at least one text string of characters sequence for use as virus signatures candidate is preceded by:

obtaining the quantity of non-virus samples containing each of the at least one text string of characters sequence, and calculating the first frequency at which each of the at least one text string of characters sequence occurs respectively in the non-virus sample set according to the quantity of non-virus samples which are included in each of the at least one text string of characters sequence.

11. The non-transitory computer-readable storage medium according to claim 9, wherein the selecting of at least one text string of characters sequence for use as virus signatures candidate is preceded by:

obtaining the quantity of virus samples containing each of the at least one text string of characters sequence, and respectively, calculating the second frequency at which each of the at least one text string of characters sequence occurs in the virus sample set according to the quantity of virus samples which are included in each of the at least one text string of characters sequence.

12. The non-transitory computer-readable storage medium according to claim 9, wherein the selecting virus signatures among the virus signatures candidate according to the information entropy comprises:

selecting the virus signatures candidate with the information entropy not exceeding a preset information entropy threshold, and determining the selected virus signatures candidate to be virus signatures; or, selecting a preset number of virus signatures candidate with the minimum information entropy, and determining the selected virus signatures candidate to be virus signatures.

\* \* \* \* \*